United States Patent Office 3,450,016
Patented June 17, 1969

3,450,016
PHOTOELECTRIC EXPOSURE METER FOR A CAMERA
Takeo Yamada, Tokyo, Japan, assignor to Nippon Kogaku K.K., Tokyo, Japan, a corporation of Japan
Filed Apr. 25, 1967, Ser. No. 633,519
Claims priority, application Japan, May 7, 1966, 41/28,502
Int. Cl. G01j 1/52
U.S. Cl. 95—10                                                      4 Claims

ABSTRACT OF THE DISCLOSURE

A photoelectric exposure meter for both spot and full view photometry. The photocell is comprised of resistances connected in series over a portion of the photocell and in parallel. A first circuit includes only those resistances connected in series and a second circuit includes all the resistances in the photocell. A switch is provided for connecting either circuit with a galvanometer. When spot metering, the first circuit of series-connected resistances is used and only light falling on these resistances is metered. A marking is provided on the viewfinder to indicate the portion of the view being metered.

---

The present invention provides an exposure meter for a single lens reflex camera of the type in which the intensity of illumination of the object to be photographed is determined by measuring the illumination of the light passing through the photographic lens. In such type cameras, there are two systems usually employed to measure the degree of illumination. In one system, known as photometry through the lens, the illumination of the whole photographic image is measured and in the other system, known as partial photometry, the illumination of the main portion of the object to be photographed is measured.

According to the present invention, these two measuring operations can be selectively made by the simple operation of a switch without changing the resistance of the photocell, and without correcting or compensating for the change of viewing field.

For this purpose, the present invention comprises a plurality of photoelectric resistances connected in series and in parallel so that the value of specific photoelectric resistances of at least one set of series connected resistances is substantially equal to the value of all of the photoelectric resistances when the light receiving surface of the resistances is uniformly exposed; a first circuit including only said specific resistances; a second circuit including all of said resistances; and a switch to selectively connect one or the other of two circuits to provide either small view photometry or wide view photometry.

The present invention will be described more in detail referring to the embodiments shown in the drawing in which:

FIG. 6 being a side view of the lens and view finder, FIG. 7 being a top view, while FIG. 8 illustrates the developed light ray paths received by the photoconductive cell.

Figure 1:
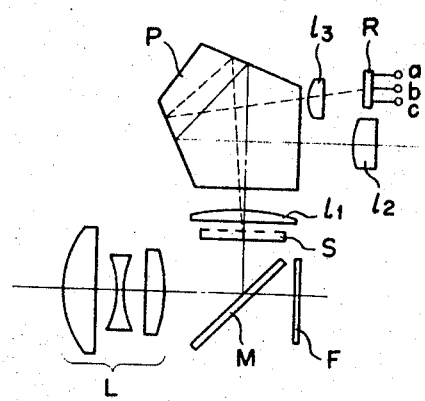
FIG. 1 illustrates schematically an arrangement of a photoelectric exposure meter of the present invention built into a single lens reflex camera.

In FIG. 1, L is a camera lens, M is a movable reflection mirror, F is the surface of a film, S is a focussing plate, P is a Penta prism, $l_1$ is a condenser lens, $l_2$ is an objective lens and $l_3$ is a light receiving lens which is provided outside of the finder light path, and R is a photoconductive cell which is provided at a place substantially conjugate with the focussing surface of the light receiving lens $l_3$.

Figure 3:
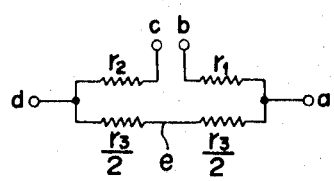
FIG. 3 shows the equivalent electrical circuit of the respective electrodes of FIG. 2 connected in series.
Figure 4:
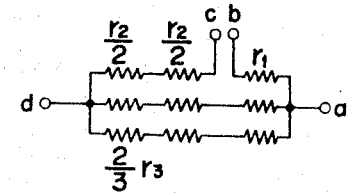
FIG. 4 shows the equivalent electrical circuit of the electrodes of FIG. 2 connected in parallel.
Figure 5:
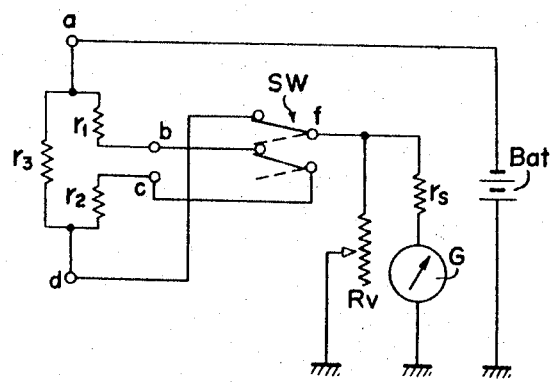
FIG. 5 illustrates the exposure meter circuit.
Figure 6:
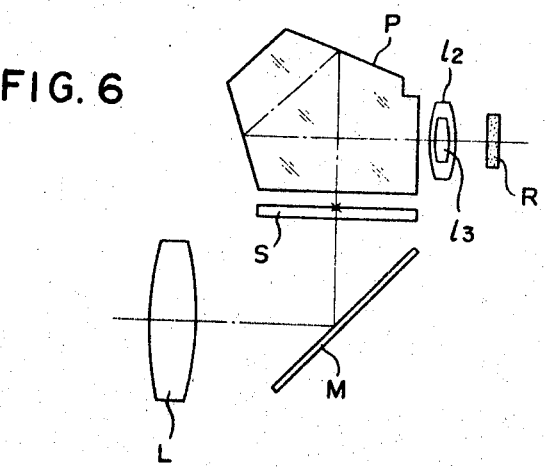
FIG. 6 to FIG. 8 illustrates the light path distribution in a single reflex camera embodying the invention.
Figure 7:
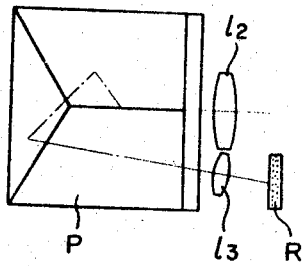

The photoconductive cell R is composed of several light receiving portions, each of which having individual photoelectric resistance, and these are arranged within an area defined between the points $m_1$, $m_2$, $m_3$ and $m_4$. This area is approximately equal to the image of the focussing plate S. The respective light receiving portions are connected in series and in parallel as shown in FIG. 3 through FIG. 5 to form the exposure meter circuit.

Elements $a$, $b$, $c$ and $d$ are the terminals connected to the respective electrodes, which constitute the light receiving portions, respectively, and element $e$ is the intermediate electrode having no terminal. Each of the electrodes is formed on the plate B of indium or gold, and a photoconductive material such as CdS, or the like, is deposited either by sintering or vacuum evaporation, or the like, between comb-formed portions of the respective electrodes.

Th spacing and length of the comb-formed portion of the respective electrodes are to be determined to satisfy the following formula;

$$r_1 \doteq \cfrac{1}{\cfrac{1}{r_1+r_2}+\cfrac{1}{r_3}}$$

Wherein, in general, $r_1$ is the photoelectric resistance of the specific light receiving portion among the several number of light receiving portions, and $r_2$ is the photoelectric resistance of other light receiving portion which is connected to $r_1$ in series, while $r_3$ is the photoelectric resistance of another light receiving portion which is connected in parallel to $r_1$ and $r_2$.

Figure 2:
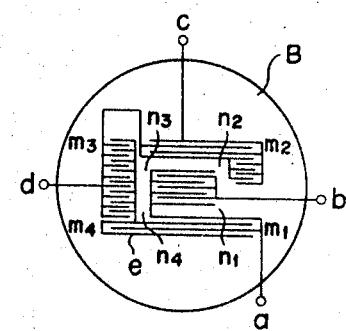
FIG. 2 shows an embodiment of the electrode arrangement of the photoconductive cell in accordance with the present invention.

To say more concretely, take an example with respect to FIG. 2. When it is assumed that, in FIG. 2, the spaces between the comb portions between $a$ and $b$, $c$ and $d$, $d$ and $e$, and $e$ and $a$ are made equal, and the lengths between the electrodes are made equal and the photoelectric resistances between $a$ and $b$, $c$ and $d$, and $d$ and $a$ are $r_1$, $r_2$ and $r_3$, respectively, then in FIG. 3, $r_1$ becomes equal to $r_2$, and $r_2$ becomes equal to $r_3/2$. Next, when $r_2$, connected in series to $r_1$, and $r_3$, connected in parallel to $r_1$, are separated by an intermediate resistance and connected as shown in FIG. 4, and respective photoelectric resistances are determined so as to satisfy the relationship of $$r_1 = \frac{r_2}{2} = \frac{2}{3}r_3$$

then another example satisfying the above described general formula is obtained.

In FIG. 5 showing the circuit of the photoelectric exposure meter of the present invention in which the same reference designaitons are used, Sw designates a switch, and G is a galvanometer. A resistance $r_s$ is series connected and a variable resistance $r_v$ is connected in parallel with the galvanometer G. A D.C. voltage source Bat is provided for the circuit. The variable resistance $r_v$ is interlocked with the operation of the shutter time, diaphragm, and the film sensitivity, or the like.

When the switch Sw is in the position shown by the solid line in FIG. 5, and an object to be photographed has a certain value of brightness, then it determines the illumination intensity on the photoconductive cell R, which in turn determines the respective values of $r_1$, $r_2$ and $r_3$. And consequently, when the variable resistance Rv is adjusted by operating the operational parameters of the exposure elements, i.e. shutter time, stop value and film sensitivity, to flow a predetermined current through the galvanometer G, e.g. the current flow through the galvanometer is adjusted to coincide the pointer thereof with a predetermined indicator, then the proper exposure of the object within the area surrounded by the points $m_1$, $m_2$, $m_3$ and $m_4$ is obtained.

When the switch Sw is moved to the position shown by the dotted line, the resistance of the photoconductive cell R between the points $a$, corresponding to the point $a$ in FIG. 2, and $f$ of the circuit is not changed, as shown in FIG. 5 only the effective light receiving surface is changed into the small area between the points $n_1$, $n_2$ $n_3$ and $n_4$ in FIG. 2. In other words, without changing the resistance of the light receiving surface, it is possible to switch from wide view photometry to partial view photometry and vice versa.

Figure 8:
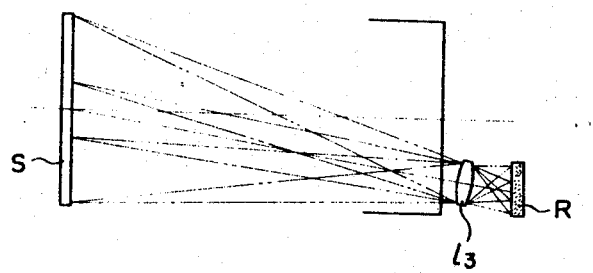

It will be noted that the view finder on cameras are generally provided with marked-off, concentric areas to aid the photographer in centering the object and also provide the field of view covered by different lenses. Such markings on the view finder may be used with the present invention to provide a reference as to the area covered during partial photometry. In FIG. 8, it will be noted that the rays of light coming from the central portion of the object fall upon the center portion $n_1$ to $n_4$ of the cell R. With a properly aligned marked-off portion on the viewing plate, the camera user can line up the view using the degree of light of only a portion of the view for his exposure settings.

With regard to the photoconductive cell, a single unit photoconductive cell or a plurality of photoconductive cells which are connected electrically to each other, can be employed in carrying out the invention. It is also possible to arrange a plurality of photoconductive cells of the present invention on the same focussing plate to increase the sensitivity.

When the present invention is employed, it is easily possible to carry out wide view photometry or narrow view photometry only by the switch-over operation of a switch. The resistance is not changed when the switching operation is carried out, and therefore there is an advantage that the galvanometer need not be corrected or compensated.

What is claimed is:
1. Photoelectric exposure meter comprising a plurality of photoelectric resistances connected in series and in parallel, the value of the specific photoelectric resistances within at least one set of series connected resistances being substantially equal to the value of all of the photoelectric resistances, when the light receiving surface of the resistances is uniformly exposed; a first circuit including only the specific resistances; a second circuit including all of the resistances; a galvanometer, an electrical source and a switch to selectively connect the two circuits to the electrical source and the galvanometer to provide wide view and narrow view photometry.

2. Photoelectric exposure meter according to claim 1, wherein the photoelectric resistances cover a definitive area of the light receiving surface, the one set of series connected resistances covering a portion of the definitive area.

3. Photoelectric exposure meter according to claim 1, wherein the photoelectric resistances cover a definitive area of the light receiving surface, the one set of series connected resistances covering the center portion of the definitive area.

4. Photoelectric exposure meter according to claim 2, wherein a view finder for the camera is provided with a marked off area or poriton of the view substantially coinciding with the portion of the light receiving surface of the photocell which receives light rays from that portion of the view.

References Cited

UNITED STATES PATENTS

| | | | |
|---|---|---|---|
| 2,879,691 | 3/1959 | Faulhaber | 356—224 |
| 3,177,762 | 4/1965 | Ito | 95—10 |
| 3,409,378 | 11/1968 | Shimomura | 356—222 |

NORTON ANSHER, *Primary Examiner.*

D. S. STALLARD, *Assistant Examiner.*

U.S. Cl. X.R.

356—222